UNITED STATES PATENT OFFICE.

FRIEDRICH BÖLLING, OF FRANKFORT-ON-THE-MAIN, BOCKENHEIM, GERMANY, ASSIGNOR OF ONE-HALF TO CHEMISCH-ELECTRISCHE FABRIK PROMETHEUS, G. M. B. H., OF FRANKFORT-ON-THE-MAIN, BOCKENHEIM, GERMANY.

PROCESS FOR THE PRODUCTION OF MOLDED BLOCKS OF SILICON CARBID.

No. 801,296.      Specification of Letters Patent.      Patented Oct. 10, 1905.

Application filed March 14, 1905. Serial No. 250,121.

*To all whom it may concern:*

Be it known that I, FRIEDRICH BÖLLING, engineer, a subject of the King of Prussia, German Emperor, residing at Frankfort-on-the-Main, Bockenheim, Germany, have invented new and useful Improvements in Processes for the Production of Molded Blocks Composed of Silicon Carbid or Boron Carbid, of which the following is a specification.

The present invention relates to a process for the production of molded blocks composed of silicon carbid or boron carbid.

The process consists in forming a body first of pure carbon, then embedding this in finely-powdered silicon carbid or boron carbid and subjecting the whole to a heating process.

As is well known, the respective carbids have been hitherto prepared by effecting the direct combination of carbon and silicon by heating a mixture of the respective elements. From this process resulted crystals of small size which were compounded with ceramic or other cementing materials and burned if they were to be shaped into articles such as grindstones or the like. From the small crystals of carborundum one cannot produce directly homogeneous bodies which are of large size in proportion to the crystals and which nevertheless possess a dense consistency. It has previously been proposed to fuse the crystals together in the electric furnace; but this causes the great drawback that the carborundum body thus fused together on account of its extraordinary hardness cannot or can be shaped only with the greatest difficulty. To obviate these drawbacks, it is proposed according to the present invention to form the required body first of pure carbon and then by means of a firing process while the body thus formed is embedded in finely-pulverized silicon carbid or boron carbid to convert said body into silicon carbid or boron carbid by absorption of the respective element.

In carrying this new process into effect the shaped pieces of carbon are best embedded in finely-powdered amorphous silicon carbid or boron carbid, because these substances are rich in the respective element and nevertheless can be obtained cheaply. The resulting pieces obtained in the place of the crystals which have their shape before the conversion into silicon carbid or boron carbid may be applied, for instance, as grindstones, for the purposes of fine grinding or polishing and also as incombustible bodies may find application in all cases in which substances like carbid are brought into the heated condition and eventually burned away—as, for instance, for electrodes for electrochemical purposes, &c. According to the present invention the carbon might also receive a provisional shape, and then after the treatment with silicon carbids or boron carbids the piece might receive its ultimate form in any suitable manner. For instance, if it be desired to prepare tubes of any required thickness or thinness or other hollow bodies of a determined profile then the process may be carried out in such a manner that the carbon bodies are only treated in their provisional form so far that an outer layer of carbid is formed and an inner core of carbon remains present, which is then ultimately burned out. The outer layer of carbid is very resistant to fire and almost incombustible, whereas the carbon-core will burn slowly even at a red heat. It is therefore only necessary to keep the article which is composed of an outer layer of carbid and an inner core of carbon, at a red heat until the inner core is burned away.

Having now described my invention and in what manner the same is to be performed, what I claim, and desire to secure by Letters Patent, is—

A process for the production of molded blocks composed of silicon carbid consisting in first forming the body of pure carbon, then embedding it in finely-powdered silicon carbid and subjecting this embedded body to a firing process at a high temperature, substantially as described and for the purpose set forth.

In testimony whereof I have signed my name to this specification in the presence of two subscribing witnesses.

FRIEDRICH BÖLLING.

Witnesses:
     JEAN GRUND,
     CARL GRUND.